US011900888B2

(12) United States Patent
An et al.

(10) Patent No.: US 11,900,888 B2
(45) Date of Patent: Feb. 13, 2024

(54) ELECTRONIC DEVICE AND DRIVING METHOD OF ELECTRONIC DEVICE

(71) Applicant: Samsung Display Co., Ltd., Yongin-Si (KR)

(72) Inventors: Taehyeong An, Hwaseong-si (KR); Jinpil Kim, Suwon-si (KR); Joon-Chul Goh, Suwon-si (KR); Dongjoon Kwag, Yongin-si (KR); Jaesung Bae, Suwon-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/950,228

(22) Filed: Sep. 22, 2022

(65) Prior Publication Data

US 2023/0222982 A1 Jul. 13, 2023

(30) Foreign Application Priority Data

Jan. 13, 2022 (KR) ........................ 10-2022-0005374

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/027* (2013.01); *G09G 2330/021* (2013.01)

(58) Field of Classification Search
CPC ...... G09G 3/20; G09G 3/3233; G09G 3/2022; G09G 3/36; G09G 3/3275; G09G 3/3266; G09G 2310/027; G09G 2330/021
See application file for complete search history.

(56) References Cited

U.S. PATENT DOCUMENTS

| | | | | |
|---|---|---|---|---|
| 9,870,732 | B2 | 1/2018 | Park et al. | |
| 10,152,908 | B2 | 12/2018 | Pyeon et al. | |
| 11,127,335 | B2 | 9/2021 | Ahn et al. | |
| 2016/0125787 | A1 * | 5/2016 | Pyeon | G09G 3/2022 345/691 |
| 2017/0148370 | A1 * | 5/2017 | Nakamura | G09G 3/3648 |

FOREIGN PATENT DOCUMENTS

| | | | |
|---|---|---|---|
| KR | 10-1561465 | B1 | 10/2015 |
| KR | 10-2021-0047417 | A | 4/2021 |
| KR | 10-2255299 | B1 | 5/2021 |

* cited by examiner

*Primary Examiner* — Michael A Faragalla
(74) *Attorney, Agent, or Firm* — Innovation Counsel LLP

(57) ABSTRACT

An electronic device is disclosed that includes a display panel, a data driving circuit, a scan driving circuit, and a driving controller. The driving controller generates image data based on a received image signal. The driving controller includes a minimum emission gray level determining unit that determines a gray level of the image signal, a pattern determining unit that determines a dither pattern of the image signal, a driving frequency sensing unit that determines a driving frequency of the image signal, and a data compensation unit that compensates for the image data based on the gray level and at least one of the dither pattern and the driving frequency.

9 Claims, 9 Drawing Sheets

FIG. 8A

DT2a

| | | | |
|---|---|---|---|
| 1 | 0 | 1 | 0 |
| 1 | 0 | 1 | 0 |
| 0 | 1 | 0 | 1 |
| 0 | 1 | 0 | 1 |
| 1 | 0 | 1 | 0 |
| 1 | 0 | 1 | 0 |
| 0 | 1 | 0 | 1 |
| 0 | 1 | 0 | 1 |

FIG. 8B

DT2b

| | | | |
|---|---|---|---|
| 0 | 1 | 0 | 1 |
| 0 | 1 | 0 | 1 |
| 1 | 0 | 1 | 0 |
| 1 | 0 | 1 | 0 |
| 0 | 1 | 0 | 1 |
| 0 | 1 | 0 | 1 |
| 1 | 0 | 1 | 0 |
| 1 | 0 | 1 | 0 |

FIG. 9A

DT3a

| | | | |
|---|---|---|---|
| 1 | 0 | 1 | 0 |
| 1 | 0 | 1 | 0 |
| 1 | 0 | 1 | 0 |
| 1 | 0 | 1 | 0 |
| 0 | 1 | 0 | 1 |
| 0 | 1 | 0 | 1 |
| 0 | 1 | 0 | 1 |
| 0 | 1 | 0 | 1 |

FIG. 9B

DT3b

| | | | |
|---|---|---|---|
| 0 | 1 | 0 | 1 |
| 0 | 1 | 0 | 1 |
| 0 | 1 | 0 | 1 |
| 0 | 1 | 0 | 1 |
| 1 | 0 | 1 | 0 |
| 1 | 0 | 1 | 0 |
| 1 | 0 | 1 | 0 |
| 1 | 0 | 1 | 0 |

ELECTRONIC DEVICE AND DRIVING METHOD OF ELECTRONIC DEVICE

CROSS-REFERENCE TO RELATED APPLICATIONS

This application claims priority under 35 U.S.C. § 119 to Korean Patent Application No. 10-2022-0005374 filed on Jan. 13, 2022, in the Korean Intellectual Property Office, the disclosures of which are incorporated by reference herein in their entireties.

BACKGROUND

1. Field

The present disclosure relates to an electronic device that provides an improved display quality and a driving method of the electronic device.

2. Description of the Related Art

An organic light emitting display device among display devices displays an image by using a light emitting diode that generates a light through the recombination of electrons and holes. The organic light emitting display device is driven with low power together and provides a fast response speed.

The organic light emitting display device includes pixels, and data lines and scan lines connected to the pixels. Each of the pixels generally includes an organic light emitting diode, and a circuit unit for controlling the amount of current flowing to the organic light emitting diode. In response to a data signal, the circuit unit controls the amount of current that flows from a first driving voltage to a second driving voltage through the organic light emitting diode. In this case, a light of predetermined luminance is generated that corresponds to an amount of current flowing through the organic light emitting diode.

An emission level of the organic light emitting diode may vary sensitively depending on the amount of current flowing to the organic light emitting diode. In particular, in the case where a low-gray level image is displayed, the emission level of the organic light emitting diode may vary greatly (or sharply) even though the amount of current flowing to the organic light emitting diode varies finely. Because it is difficult to control the fine variations in the current amount, low-gray level Mura (or blemish) may occur.

SUMMARY

Embodiments of the present disclosure may provide an electronic device providing an improved display quality and a driving method of the electronic device.

According to an embodiment, an electronic device may include a display panel that displays an image and includes a plurality of pixels connected with a plurality of data lines and a plurality of scan lines, a data driving circuit that drives the plurality of data lines, a scan driving circuit that drives the plurality of scan lines, and a driving controller that generates image data based on a received image signal and controls the data driving circuit and the scan driving circuit. The driving controller may include a minimum emission gray level determining unit that determines a gray level of the image signal, a pattern determining unit that determines a dither pattern of the image signal, a driving frequency sensing unit that determines a driving frequency of the image signal, and a data compensation unit that compensates for the image data based on the gray level and at least one of the dither pattern and the driving frequency.

The minimum emission gray level determining unit may be configured to determine whether the gray level is a predetermined value or less.

The pattern determining unit and the driving frequency sensing unit may be configured to operate when the gray level is the predetermined value or less.

The pattern determining unit may be configured to determine whether dithering is applied to the image data when the gray level is the predetermined value or less. The data compensation unit may be configured to not compensate for the image data when it is determined that the dithering is not applied.

The pattern determining unit may be configured to determine whether dithering is applied to the image data when the gray level is the predetermined value or less. The driving frequency sensing unit may be configured to determine whether the display panel operates in a variable driving frequency mode when it is determined that the dithering is applied. The data compensation unit may be configured to compensate for the image data based on the gray level and the dither pattern when it is determined that the display panel does not operate in the variable driving frequency mode.

The pattern determining unit may be configured to determine whether dithering is applied to the image data when the gray level is the predetermined value or less. When it is determined that the dithering is applied, the driving frequency sensing unit may be configured to determine whether the display panel operates in a variable driving frequency mode. The data compensation unit may be configured to compensate for the image data based on the gray level, the dither pattern, and the driving frequency when it is determined that the display panel operates in the variable driving frequency mode.

The data compensation unit may be configured to not compensate for the image data when the gray level exceeds the predetermined value.

The display panel may be configured to be driven in units of frame, and the pattern determining unit may be configured to determine the dither pattern every frame.

The display panel may be configured to be driven in units of frame, and the driving frequency sensing unit may be configured to determine the driving frequency every frame.

The data compensation unit may include a lookup table based on at least one of the dither pattern and the driving frequency, and the data compensation unit may be configured to compensate for the image data based on the lookup table.

The display panel may be divided into a plurality of areas, and the data compensation unit may be configured to compensate for a portion of the image data, which is provided to at least some of the plurality of areas.

According to an embodiment, a driving method of an electronic device may include generating image data based on an image signal received for displaying an image in a display panel, determining a gray level of the image based on the image signal, determining a dither pattern of the image and whether dithering is applied to the image, based on the image signal, determining a driving frequency of the image based on the image signal, and determining whether to compensate for the image data based on the gray level and at least one of the dither pattern and the driving frequency and compensating for the image data.

The determining of the gray level of the image may include determining whether the gray level is a predetermined value or less.

The determining whether to compensate for the image data may include determining that there is no need to compensate for the image data when the gray level exceeds the predetermined value.

The determining of the dither pattern may include determining whether dithering is applied the image data when the gray level is the predetermined valueor less.

The determining whether to compensate for the image data may include determining that there is no need to compensate for the image data when it is determined that the dithering is not applied.

The determining of the driving frequency may include determining that the driving frequency of the image signal is variable when it is determined that the dithering is applied.

The compensating for the image data may include compensating for the image data only based on the gray level and the dither pattern when the gray level is the predetermined value or less, the dither pattern is applied to the image signal, and the display panel does not operate in a variable driving frequency.

The compensating for the image data may include compensating for the image data based on the gray level, the dither pattern, and the driving frequency when the gray level is the predetermined value or less, the dither pattern is applied to the image signal, and the display panel operates in a variable driving frequency.

The display panel may be divided into a plurality of areas, and the compensating for the image data may include compensating for a portion of the image data, which is provided to at least some of the plurality of areas.

BRIEF DESCRIPTION OF THE FIGURES

The above and other objects and features of the present disclosure will become apparent by describing in detail embodiments thereof with reference to the accompanying drawings.

FIGS. 7A, 7B, 8A, 8B, 9A, and 9B illustrate dither patterns according to an embodiment of the present disclosure.

DETAILED DESCRIPTION

Figure 1:
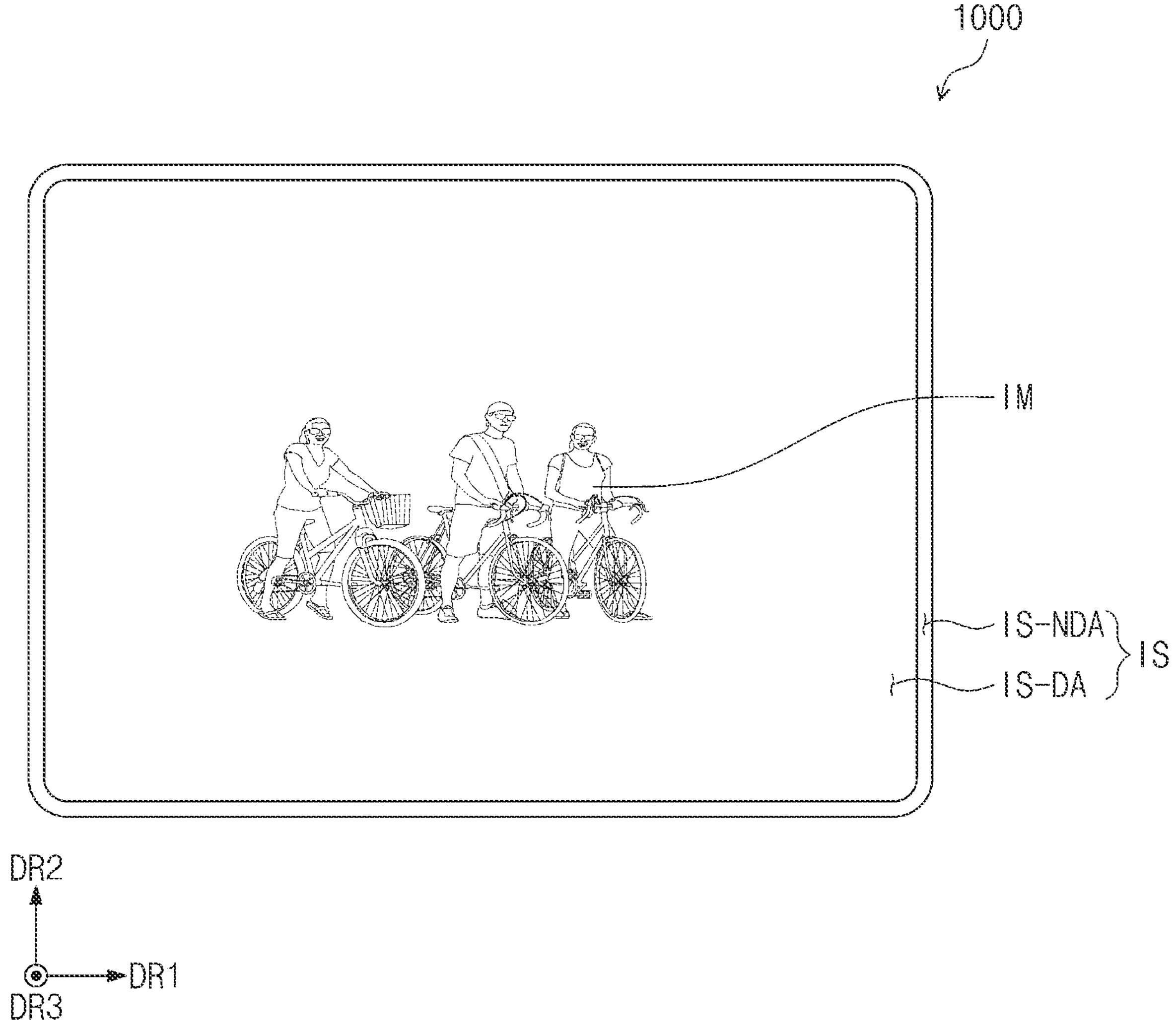
FIG. 1 is a perspective view of an electronic device according to an embodiment of the present disclosure.

In the specification, the expression that a first component (or area, layer, part, portion, etc.) is "on", "connected with", or "coupled to" a second component means that the first component is directly on, connected with, or coupled to the second component or means that a third component is disposed therebetween.

The same reference numerals refer to the same components. In addition, in drawings, thicknesses, proportions, and dimensions of components may be exaggerated to describe the technical features effectively.

As used herein, the word "or" means logical "or" so, unless the context indicates otherwise, the expression "A, B, or C" means "A and B and C," "A and B but not C," "A and C but not B," "B and C but not A," "A but not B and not C," "B but not A and not C," and "C but not A and not B."

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

Also, the terms "under", "below", "on", "above", etc. are used to describe the correlation of components illustrated in drawings. The terms that are relative in concept are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to accompanying drawings.

FIG. 1 is a perspective view of an electronic device according to an embodiment of the present disclosure.

Referring to FIG. 1, an electronic device 1000 may be a device that is activated depending on an electrical signal. The electronic device 1000 may include a large-sized electronic device such as a television, a monitor, or an outer billboard. Also, the electronic device 1000 may include small and medium-sized electronic devices such as a personal computer, a notebook computer, a personal digital terminal, an automotive navigation system, a game console, a smartphone, a tablet, and a camera. However, the present disclosure is not limited thereto. For example, the electronic device 1000 may include any other electronic devices unless departing from the scope of the invention.

The electronic device 1000 is in the shape of a rectangle having a long side (or edge) extending in a first direction DR1 and a short side (or edge) extending in a second direction DR2 intersecting the first direction DR1. For example, the second direction DR2 may be perpendicular to the first direction DR1. However, this is only an example, and the shape of the electronic device 1000 according to an embodiment of the present disclosure is not limited thereto. For example, the electronic device 1000 may be implemented in various shapes.

In the electronic device 1000, a display surface IS that is parallel to the first direction DR1 and the second direction DR2 may be defined. The display surface IS may include an active area IS-DA and a peripheral area IS-NDA. The active area IS-DA may refer to an area in which an image IM is displayed. The active area IS-DA may refer to an area in which a plurality of pixels PX (refer to FIG. 2) are arranged. The peripheral area IS-NDA may be adjacent to the active area IS-DA.

The electronic device 1000 may display the image IM in the active area IS-DA so as to face a third direction DR3. The third direction DR3 may be referred to as a "thickness direction". The image IM may include a still image as well as a moving image. The display surface IS on which the image IM is displayed may correspond to a front surface of the electronic device 1000.

In this embodiment, a front surface (or an upper/top surface) and a rear surface (or a lower/bottom surface) of each member may be defined with respect to a direction in which the image IM is displayed. The front surface and the rear surface may face away from each other in the third direction DR3, and a normal direction of each of the front surface and the rear surface may be parallel to the third direction DR3. In the specification, "when viewed from above a plane" may mean "when viewed in the third direction DR3".

A separation distance between the front surface and the rear surface in the third direction DR3 may correspond to a thickness of the electronic device 1000 in the third direction DR3. Meanwhile, the first direction DR1, the second direction DR2, and the third direction DR3 may be relative concepts and may be changed to different directions.

Figure 2:
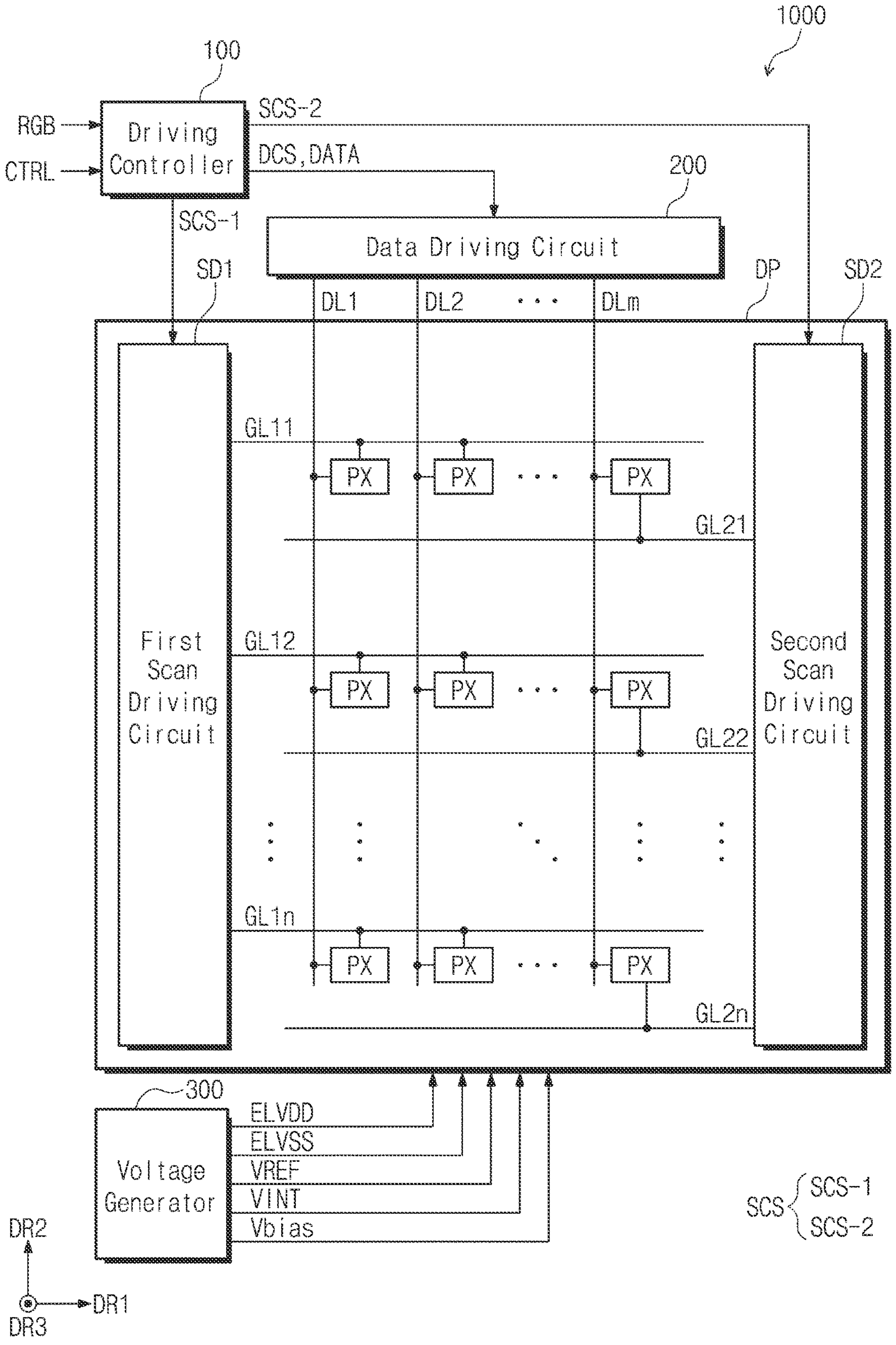
FIG. 2 is a block diagram of an electronic device according to an embodiment of the present disclosure.

FIG. 2 is a block diagram of an electronic device according to an embodiment of the present disclosure.

The electronic device 1000 may include a driving controller 100, a data driving circuit 200, a voltage generator 300, and a display panel DP.

The driving controller 100 receives an image signal RGB and a control signal CTRL. The driving controller 100 may generate an image data "DATA" by converting a data format of the image signal RGB in compliance with the specification for an interface with the data driving circuit 200. The driving controller 100 may output a scan control signal SCS, a data control signal DCS, and an emission control signal.

The data driving circuit 200 may receive the data control signal DCS and the image data "DATA" from the driving controller 100. The data driving circuit 200 may convert the image data "DATA" into data signals and outputs the data signals to a plurality of data lines DL1 to DLm to be described later. The data signals may refer to analog voltages corresponding to a gray level value of the image data "DATA".

The voltage generator 300 may generate voltages necessary for an operation of the display panel DP. In an embodiment of the present disclosure, the voltage generator 300 may generate a first driving voltage ELVDD, a second driving voltage ELVSS, a reference voltage VREF, an initialization voltage VINT, and a bias voltage Vbias. However, the present disclosure is not limited thereto. For example, the voltage generator 300 may not generate some of the above voltages or may further generate any other voltage(s) in addition to the above voltages.

The display panel DP may display the image IM (refer to FIG. 1).

The display panel DP according to an embodiment of the present disclosure may be a light emitting display panel but is not particularly limited thereto. For example, the display panel DP may include an organic light emitting display panel, a quantum dot light emitting display panel, a micro LED display panel, or a nano LED display panel. An emission layer of the organic light emitting display panel may include an organic light emitting material. An emission layer of the quantum dot light emitting display panel may include a quantum dot, a quantum rod, or the like. An emission layer of the micro LED display panel may include a micro LED. An emission layer of the nano LED display panel may include a nano LED.

The display panel DP may include scan lines GL11 to GL1*n* and GL21 to GL2*n*, the data lines DL1 to DLm, and the pixels PX.

The display panel DP may include a first scan driving circuit SD1 and a second scan driving circuit SD2.

In an embodiment of the present disclosure, the first scan driving circuit SD1 may be disposed on a first side of the display panel DP. The first scan lines GL11 to GL1*n* may extend from the first scan driving circuit SD1 in the first direction DR1.

The second scan driving circuit SD2 may be disposed on a second side of the display panel DP. The second scan lines GL21 to GL2*n* may extend from the second scan driving circuit SD2 in a direction facing away from the first direction DR1.

The scan lines GL11 to GL1*n* and GL21 to GL2*n* may be arranged to be spaced from each other in the second direction DR2. The data lines DL1 to DLm may extend from the data driving circuit 200 in a direction facing away from the second direction DR2 and may be arranged to be spaced from one another in the first direction DR1.

In the example illustrated in FIG. 1, the first scan driving circuit SD1 and the second scan driving circuit SD2 may be arranged to face each other, with the pixels PX interposed therebetween, but the present disclosure is not limited thereto. For example, the first scan driving circuit SD1 and the second scan driving circuit SD2 may be disposed adjacent to each other on the first side or the second side of the display panel DP. In an embodiment, the first scan driving circuit SD1 and the second scan driving circuit SD2 may be implemented with one circuit.

The plurality of pixels PX may be electrically connected with the scan lines GL11 to GL1*n* and GL21 to GL2*n* and the data lines DL1 to DL*m*.

Each of the plurality of pixels PX may receive the first driving voltage ELVDD, the second driving voltage ELVSS, the reference voltage VREF, the initialization voltage VINT, and the bias voltage Vbias from the voltage generator 300. However, this is only an example, and voltages that are provided to the plurality of pixels PX according to an embodiment of the present disclosure are not limited thereto. Voltages that are provided to the plurality of pixels PX may further include any other voltage(s) in addition to the above voltages.

The first scan driving circuit SD1 may receive a first scan control signal SCS-1 from the driving controller 100. The first scan driving circuit SD1 may output scan signals to the first scan lines GL11 to GL1*n* in response to the first scan control signal SCS-1.

The second scan driving circuit SD2 may receive a second scan control signal SCS-2 from the driving controller 100. The second scan driving circuit SD2 may output scan signals to the second scan lines GL21 to GL2*n* in response to the second scan control signal SCS-2.

Unlike the present disclosure, in the case where the display panel DP becomes larger in size, as a scan signal is output from a scan driving circuit and then goes in a direction facing away from the display panel DP, a signal delay may occur due to an RC component of a scan line. The RC component of the scan line may cause a difference between a scan signal waveform of an area adjacent to the scan driving circuit of the display panel DP and a scan signal waveform of an area spaced from the scan driving circuit. That is, a luminance difference may be present between pixels PX of the adjacent area to the scan driving circuit of the display panel DP and pixels PX of the area relatively spaced therefrom. However, according to the present disclosure, the first scan driving circuit SD1 and the second scan driving circuit SD2 of the display panel DP may be spaced from each other, with the plurality of pixels PX interposed therebetween. As such, the influence of the RC component of the scan lines GL11 to GL1*n* and GL21 to GL2*n* may decrease. This may mean that a luminance difference of the plurality of pixels PX decreases. Accordingly, the electronic device 1000 (refer to FIG. 1) providing an improved display quality may be provided.

Figure 3:
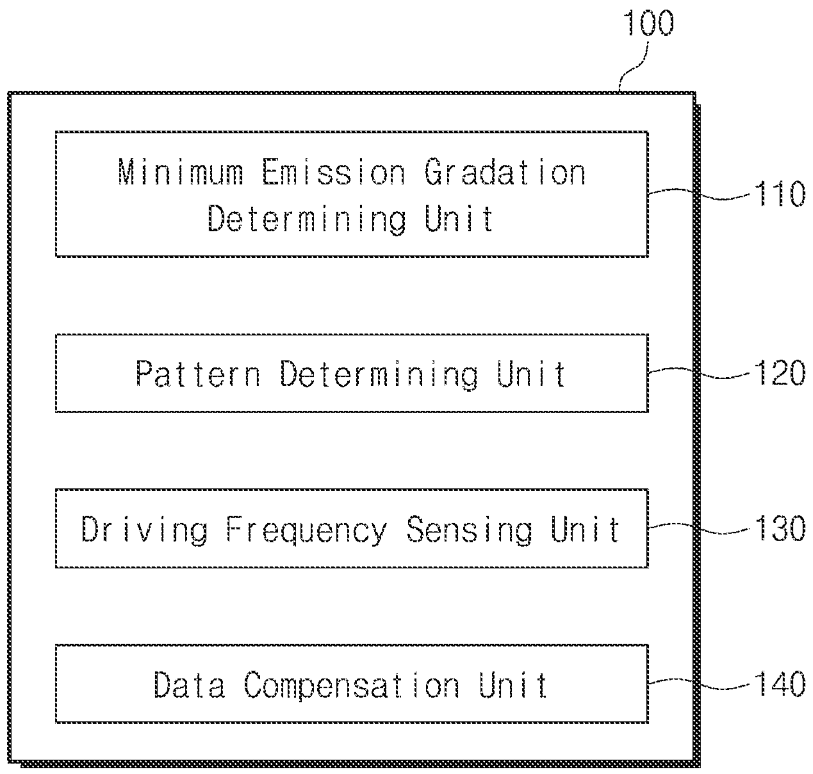
FIG. 3 illustrates a driving controller according to an embodiment of the present disclosure.

FIG. 3 illustrates a driving controller according to an embodiment of the present disclosure.

Referring to FIGS. 2 and 3, the driving controller 100 may include a minimum emission gray level determining unit 110, a pattern determining unit 120, a driving frequency sensing unit 130, and a data compensation unit 140.

The minimum emission gray level determining unit 110 may determine a gray level of the image signal RGB. The minimum emission gray level determining unit 110 may compare the gray level with a predetermined value (or a predetermined reference value). The gray level may be refer to as a grayscale. The gray level may refer to the way to express an image only by using brightness information without using color information. The gray level may express the image IM (refer to FIG. 1) by using a brightness value from 0 to 255, that is, a total of 256 levels of brightness values. For example, the "0" level may indicate a black color, and the "255" level may indicate a white color.

The minimum emission gray level determining unit 110 may determine whether the gray level is the predetermined value or less. For example, the predetermined value may have a gray level value of 16. When the gray level is the predetermined value or less, the minimum emission gray level determining unit 110 may allow the pattern determining unit 120 and the driving frequency sensing unit 130 to operate.

The pattern determining unit 120 may determine a dither pattern of the image signal RGB. That is, the pattern determining unit 120 may determine whether a dither pattern applied to the image signal RGB has any pattern.

The dither pattern may include a plurality of dither patterns, and the plurality of dither patterns may have an a×b size (a and b being a natural number). The plurality of dither patterns may be a pattern composed of data elements each having a first value or a second value. The plurality of dither patterns will be described later.

Unlike the present disclosure, in the case of a low-gray level state in which the gray level of the image signal RGB is the predetermined value or less, it may be difficult to stably control a fine current that is provided to each of the plurality of pixels PX. In this case, a Mura (or blemish) may be visually perceived. Also, there may be a problem about using an optical compensation method in the low-gray level state due to low luminance. However, according to the present disclosure, in the case of the image signal RGB has a first gray level being less than or equal to the predetermined value, the driving controller 100 may apply the plurality of dither patterns that make it possible to operate at a second gray level higher than the first gray level. The second gray level may have a value making it possible to stably control a current. The driving controller 100 may generate the image data "DATA" by repeating the plurality of dither patterns in a first frame and a second frame next to the first frame. That is, the driving controller 100 may control a spatial frequency and a temporal frequency of the image signal RGB such that the image IM (refer to FIG. 1) is visually perceived at the first gray level. Accordingly, the electronic device 1000 (refer to FIG. 1) providing an improved display quality may be provided.

The driving frequency sensing unit 130 may determine a driving frequency of the image signal RGB. That is, the driving frequency sensing unit 130 may determine a value of a driving frequency applied to the image signal RGB.

According to the present disclosure, the display panel DP may operate at a variable driving frequency. This may mean that the display panel DP operates in a variable driving frequency mode. For example, it may be possible to decrease a driving frequency of the electronic device 1000 (refer to FIG. 1) in a specific operating environment such as an environment in which a still image is displayed. Accordingly, the electronic device 1000 (refer to FIG. 1) in which power consumption is reduced may be provided.

The data compensation unit 140 may compensate for the image data "DATA" based on a gray level and at least one of a dither pattern and a driving frequency. This will be described later.

Figure 4:
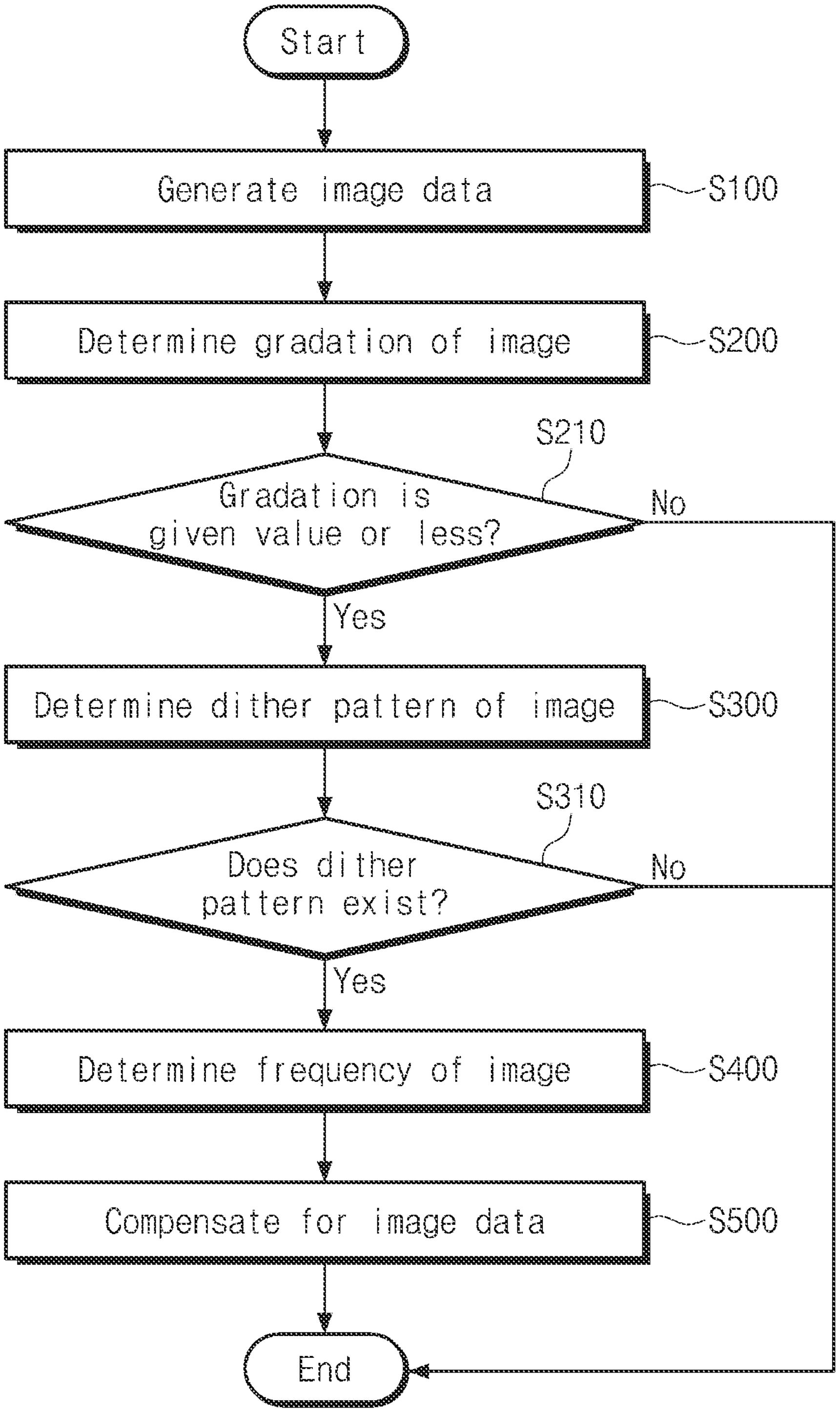
FIG. 4 is a flowchart illustrating a driving method of an electronic device according to an embodiment of the present disclosure.

FIG. 4 is a flowchart illustrating a driving method of an electronic device according to an embodiment of the present disclosure.

Referring to FIGS. 2 to 4, to display the image IM (refer to FIG. 1) in the display panel DP, the driving controller 100 may receive the image signal RGB to generate the image data "DATA" (S100).

The minimum emission gray level determining unit 110 may determine a gray level of the image IM based on the image signal RGB (S200).

The determining (S200) of the gray level of the image IM may further include determining whether the gray level is the predetermined value or less (S210). When the gray level exceeds the predetermined value, the data compensation unit 140 may not compensate for the image data "DATA".

The pattern determining unit 120 may determine a dither pattern of the image IM based on the image signal RGB (S300). Operation S300 in which the dither pattern is determined may be performed when the gray level is the predetermined value or less.

Operation S300 in which the dither pattern is determined may further include determining whether a dither pattern is present, when the gray level is the predetermined value or less (S310). The determining whether the dither pattern is present may be referred to determining whether to perform dithering on the image data "DATA". When it is determined that the dither pattern is not applied to the image signal RGB, the data compensation unit 140 may not compensate for the image data "DATA".

The driving frequency sensing unit 130 may determine a driving frequency of the image IM based on the image signal RGB (S400). The determining (S400) of the driving frequency may be performed when the dither pattern is applied to the image signal RGB.

The determining (S400) of the driving frequency may further include whether to change the driving frequency of the image signal RGB when the dither pattern is applied to the image signal RGB.

The data compensation unit 140 may determine whether to compensate for the image data "DATA" based on the gray level and at least one of the dither pattern and the driving frequency and may compensate for the image data "DATA" (S500).

In the case where the gray level is the predetermined value or less, the dither pattern is applied to the image signal RGB, and the display panel DP does not operate in the variable driving frequency mode, the data compensation unit 140 may compensate for the image data "DATA" only based on the gray level and the dither pattern.

In the case where the gray level is the predetermined value or less, the dither pattern is applied to the image signal RGB, and the display panel DP operates in the variable driving frequency mode, the data compensation unit 140 may compensate for the image data "DATA" based on the gray level, the dither pattern, and the driving frequency.

Figure 5:
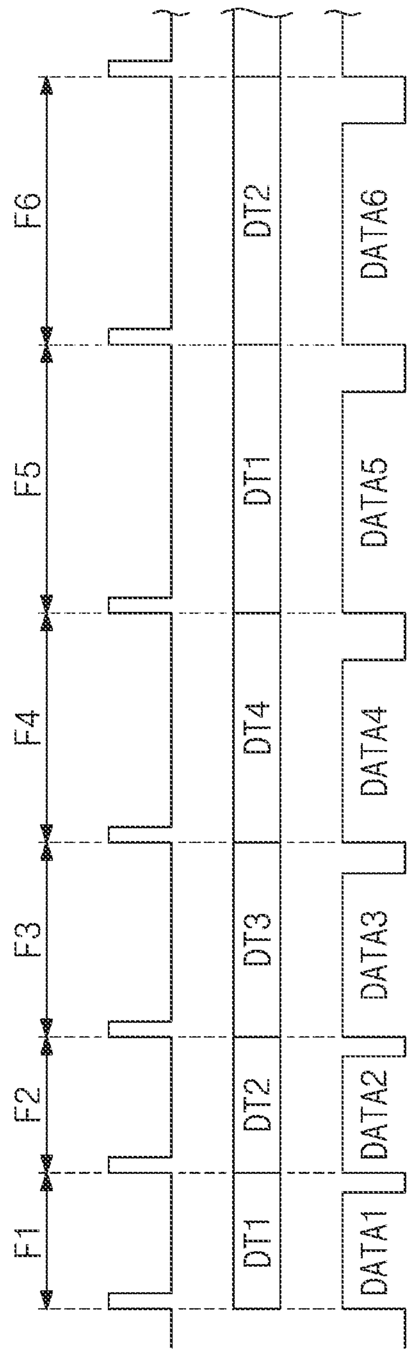
FIG. 5 is a timing diagram illustrating image data according to an embodiment of the present disclosure.

FIG. 5 is a timing diagram illustrating image data according to an embodiment of the present disclosure.

Referring to FIGS. 2, 3, and 5, the display panel DP may operate in the variable driving frequency mode. The display panel DP may be driven based on the image data "DATA" in units of frame. The pattern determining unit 120 may determine a dither pattern every frame. The driving frequency sensing unit 130 may determine a driving frequency every frame.

An example in which the display panel DP operates based on first to sixth frames F1 to F6 is illustrated in FIG. 5. The plurality of frames F1 to F6 may respectively correspond to a plurality of image data DATA1 to DATA6. The plurality of frames F1 to F6 may refer to periods in which the image IM (refer to FIG. 1) is displayed based on the plurality of image data DATA1 to DATA6.

The data compensation unit 140 may include a lookup table that is provided based on at least one of a dither pattern and a driving frequency. The data compensation unit 140 may compensate for the image data "DATA" based on the lookup table. The lookup table may store a plurality of dither patterns and a plurality of driving frequencies as a variable. However, this is only an example, and an image data compensating method of the data compensation unit 140 according to an embodiment of the present disclosure is not limited thereto. For example, the data compensation unit 140 may compensate for the image data "DATA" by using an equation in which a dither pattern and a driving frequency are used as a variable.

In the first frame F1, the minimum emission gray level determining unit 110 may determine that a gray level of the image signal RGB is the predetermined value or less. The pattern determining unit 120 may determine whether dithering is applied to the image data "DATA" of the image signal RGB and may determine that a first dither pattern DT1 is applied. The driving frequency sensing unit 130 may determine that a driving frequency of the image signal RGB is a first driving frequency. For example, the first driving frequency may be 120 Hz (hertz). The data compensation unit 140 may apply a first lookup table to the image data "DATA" to generate first image data DATA1.

In the second frame F2, the minimum emission gray level determining unit 110 may determine that a gray level of the image signal RGB is the predetermined value or less. The pattern determining unit 120 may determine whether dithering is applied to the image data "DATA" of the image signal RGB and may determine that a second dither pattern DT2 different from the first dither pattern DT1 is applied. The driving frequency sensing unit 130 may determine that a driving frequency of the image signal RGB is the first driving frequency. For example, the first driving frequency may be 120 Hz. The data compensation unit 140 may apply a second lookup table different from the first lookup table to the image data "DATA" to generate second image data DATA2. For example, in the above embodiment, a dither pattern of the second frame F2 may be different from a dither pattern of the first frame F1.

Because the same driving frequency as the first frame F1 is applied to the second frame F2 and the first and second frames F1 and F2 are different in dither pattern, the second lookup table different from the first lookup table may be provided.

In the third frame F3, the minimum emission gray level determining unit 110 may determine that a gray level of the image signal RGB is the predetermined value or less. The pattern determining unit 120 may determine whether dithering is applied to the image data "DATA" of the image signal RGB and may determine that a third dither pattern DT3 different from the first dither pattern DT1 and the second dither pattern DT2 is applied. The driving frequency sensing unit 130 may determine that a driving frequency of the image signal RGB is a second driving frequency. The second driving frequency may be lower than the first driving frequency. For example, the second driving frequency may be 100 Hz. The data compensation unit 140 may apply a third lookup table different from the first lookup table and the second lookup table to the image data "DATA" to generate third image data DATA3.

In the fourth frame F4, the minimum emission gray level determining unit 110 may determine that a gray level of the image signal RGB is the predetermined value or less. The pattern determining unit 120 may determine whether dithering is applied to the image data "DATA" of the image signal RGB and may determine that a fourth dither pattern DT4 different from the first to third dither patterns DT1 to DT3 is applied. The driving frequency sensing unit 130 may determine that a driving frequency of the image signal RGB is a third driving frequency. The third driving frequency may be lower than the second driving frequency. For example, the third driving frequency may be 80 Hz. The data compensation unit 140 may apply a fourth lookup table different from the first to third lookup tables to the image data "DATA" to generate fourth image data DATA4.

In the fifth frame F5, the minimum emission gray level determining unit 110 may determine that a gray level of the image signal RGB is the predetermined value or less. The pattern determining unit 120 may determine whether dithering is applied to the image data "DATA" of the image signal RGB and may determine that the first dither pattern DT1 is applied. The driving frequency sensing unit 130 may determine that a driving frequency of the image signal RGB is a fourth driving frequency. The fourth driving frequency may be lower than the third driving frequency. For example, the fourth driving frequency may be 60 Hz. The data compensation unit 140 may apply a fifth lookup table different from the first to fourth lookup tables to the image data "DATA" to generate fifth image data DATA5.

Because the driving frequency of the fifth frame F5 is different from the driving frequency of the first frame F1 and the same dither pattern as the first frame F1 is applied to the fifth frame F5, the fifth lookup table different from the first to fourth lookup table may be provided.

In the sixth frame F6, the minimum emission gray level determining unit 110 may determine that a gray level of the image signal RGB is the predetermined value or less. The pattern determining unit 120 may determine whether dithering is applied to the image data "DATA" of the image signal RGB and may determine that the second dither pattern DT2 is applied. The driving frequency sensing unit 130 may determine that a driving frequency of the image signal RGB is the fourth driving frequency. For example, the fourth driving frequency may be 60 Hz. The data compensation unit 140 may apply a sixth lookup table different from the first to fifth lookup tables to the image data "DATA" to generate sixth image data DATA6.

Because the same driving frequency as the fifth frame F5 is applied to the sixth frame F6 and the fifth and sixth frames F5 and F6 are different in dither pattern, the sixth lookup table different from the fifth lookup table may be provided.

Figure 6:
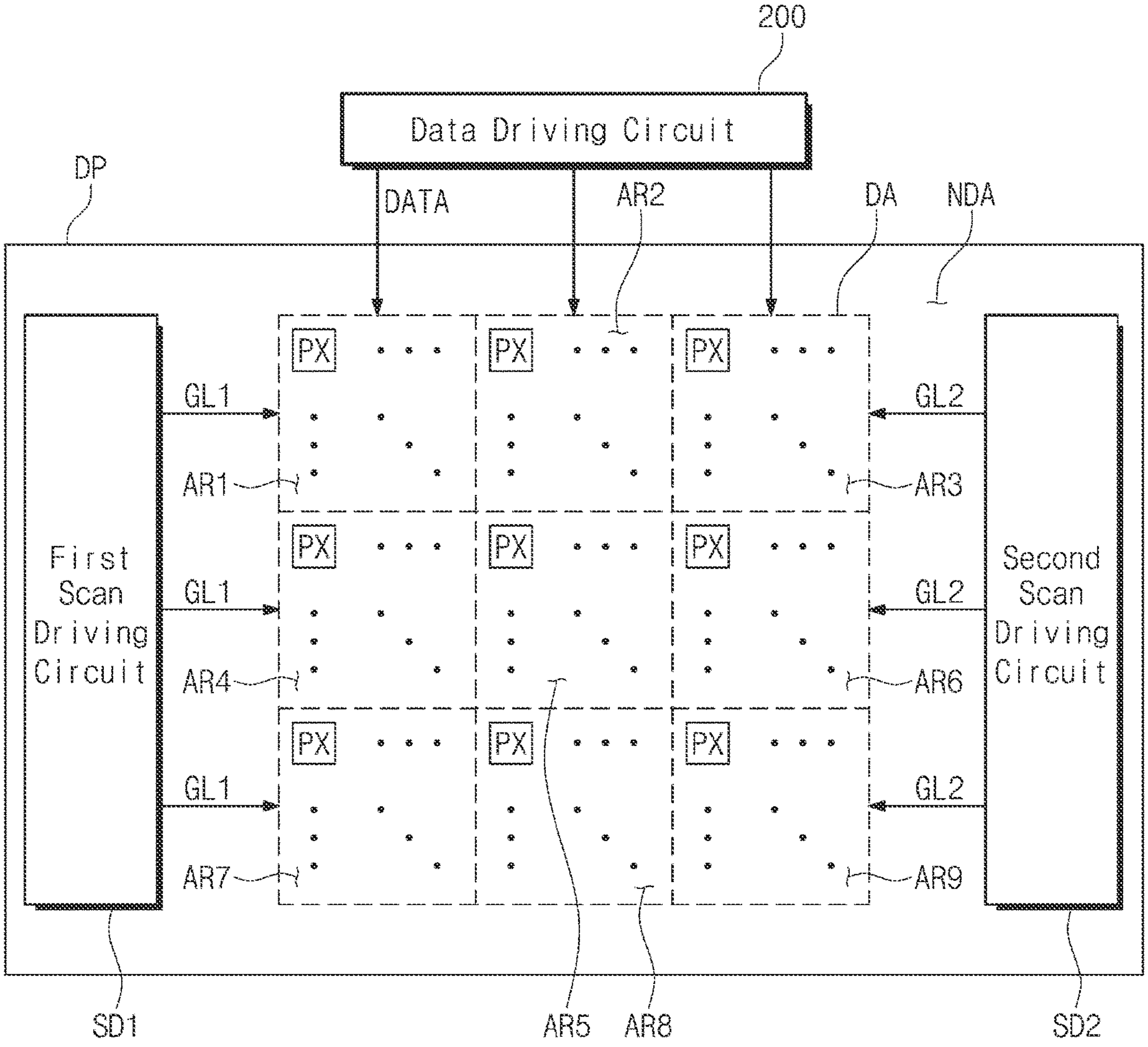
FIG. 6 is a plan view illustrating an electronic device according to an embodiment of the present disclosure.
Figure 7A:
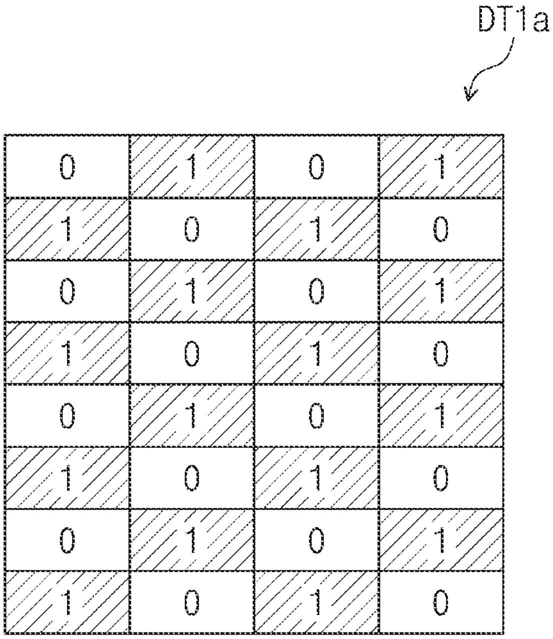
Figure 7B:
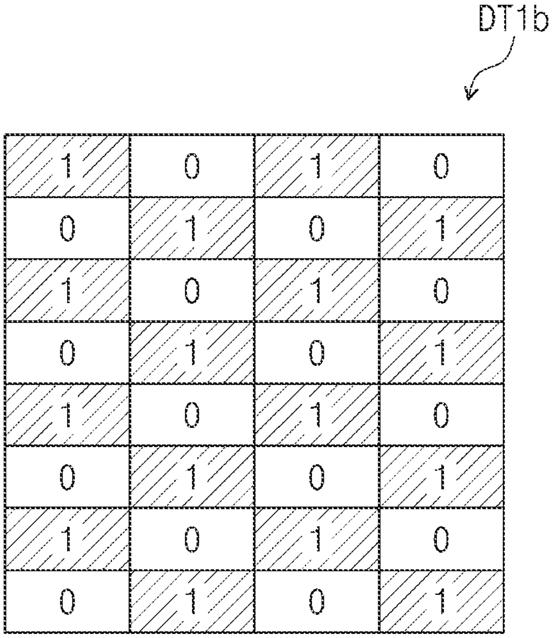

FIG. 6 is a plan view illustrating an electronic device according to an embodiment of the present disclosure, and FIGS. 7A to 9B illustrate dither patterns according to an embodiment of the present disclosure.

Referring to FIGS. 3 and 6 to 9A, an active area DA and a peripheral area NDA may be defined in the display panel DP. The peripheral area NDA may be disposed adjacent to the active area DA. The plurality of pixels PX may be arranged in the active area DA. The active area DA may be divided into a plurality of areas AR1 to AR9. An embodiment in which the display panel DP is divided into 9 areas is illustrated in FIG. 6, but the number of the plurality of areas according to an embodiment of the present disclosure is not limited thereto.

The first scan signal GL1 may be provided from the first side of the display panel DP.

The second scan signal GL2 may be provided from the second side of the display panel DP.

The scan line RC component may make waveforms of the first scan signal GL1 and the second scan signal GL2 different depending on locations of the plurality of areas AR1 to AR9. For example, a difference between first loads of the plurality of scan signals GL1 and GL2 may occur due to the scan line RC component. In this case, a difference may occur between a plurality of scan signals (or a deviation may occur at each of a plurality of scan signals). Accordingly, waveforms of the plurality of scan signals may be different.

A data line RC component may cause a change in a waveform of the image data "DATA" depending on locations of the plurality of areas AR1 to AR9. For example, a difference between second loads of a plurality of image data "DATA" may occur due to the data line RC component. The second load may be different from the first load. In this case, a delay deviation may occur at each of a plurality of image data. That is, effective charging times of the image data "DATA" of the plurality of areas AR1 to AR9 may be different.

For example, the first area AR1 may be adjacent to the data driving circuit 200 and the first scan driving circuit SD1. Because the image data "DATA" and the first scan signal GL1 are synchronized in the first area AR1, a sufficient effective charging time may be secured in the first area AR1.

The third area AR3 may be adjacent to the data driving circuit 200 and the second scan driving circuit SD2. Because the image data "DATA" and the second scan signal GL2 are synchronized in the third area AR3, a sufficient effective charging time may be secured in the third area AR3.

The eighth area AR8 may be spaced from the data driving circuit 200 and may be spaced from the first scan driving circuit SD1 and the second scan driving circuit SD2. Because the image data "DATA" delayed by the data line RC component and the first scan signal GL1 or the second scan signal GL2 delayed by the scan line RC component are synchronized in the eighth area AR8, a sufficient effective charging time may be secured in the eighth area AR8.

For example, because the eighth area AR8 is distant from the data driving circuit 200, a signal delay due to the RC component may occur in the image data "DATA". Also, because the eighth area AR8 is distant from the first scan driving circuit SD1 and the second scan driving circuit SD2, a signal delay due to the RC component may occur in the first scan signal GL1 and the second scan signal GL2. In the eighth area AR8, the signal coupling may occur between the delayed image data "DATA" and the delayed first scan signal GL1 or the delayed second scan signal GL2 due to delayed times thereof. Accordingly, an effective charging time may be secured.

The fifth area AR5 may be spaced from the data driving circuit 200 and may be spaced from the first scan driving circuit SD1 and the second scan driving circuit SD2. Because the image data "DATA" delayed by the data line RC component and the first scan signal GL1 or the second scan signal GL2 delayed by the scan line RC component are synchronized in the fifth area AR5, a predetermined effective charging time may be secured in the fifth area AR5.

Comparing the effective charging time of the fifth area AR5 and the effective charging time of the eighth area AR8, the first scan signal GL1 and the second scan signal GL2 may be delayed due to the scan line RC component, in each of the fifth area AR5 and the eighth area AR8. Compared to the image data "DATA" provided to the eighth area AR8, a delay due to the data line RC component may occur relatively small in the image data "DATA" provided to the fifth area AR5. Because the relatively small delayed image data "DATA" and the delayed first scan signal GL1 or the delayed second scan signal GL2 are synchronized in the fifth area AR5, a time during which signals are synchronized may be short in the fifth area AR5. Accordingly, the effective charging time of the fifth area AR5 may be relatively small. Because the delayed image data "DATA" and the delayed first scan signal GL1 or the delayed second scan signal GL2 are synchronized in the eighth area AR8, a time during which signals are synchronized may be sufficiently secured in the eighth area AR8. Accordingly, the effective charging time of the fifth area AR5 may be smaller than the effective charging time of each of the first area AR1, the third area AR3, and the eighth area AR8.

The second area AR2 may be adjacent to the data driving circuit 200 and may be spaced from the first scan driving circuit SD1 and the second scan driving circuit SD2. Because the image data "DATA" and the first scan signal GL1 or the second scan signal GL2 delayed by the scan line RC component are synchronized in the second area AR2, a predetermined effective charging time may be secured in the second area AR2.

Comparing the effective charging times of the second area AR2 and the fifth area AR5, the first scan signal GL1 and the second scan signal GL2 may be delayed due to the scan line RC component, in each of the second area AR2 and the fifth area AR5. Compared to the image data "DATA" provided to the fifth area AR5, a delay due to the data line RC component may occur relatively small in the image data "DATA" provided to the second area AR2. Because the relatively small delayed image data "DATA" and the delayed first scan signal GL1 or the delayed second scan signal GL2 are synchronized in the second area AR2, a time during which signals are synchronized may be short in the second area AR2. Accordingly, the effective charging time of the second area AR2 may be relatively small. Because the delayed image data "DATA" and the delayed first scan signal GL1 or the delayed second scan signal GL2 are synchronized in the fifth area AR5, a time during which signals are synchronized may be sufficiently secured in the fifth area AR5. Accordingly, the effective charging time of the fifth area AR5 may be relatively great. That is, the effective charging time of the second area AR2 may be smaller than the effective charging time of the fifth area AR5.

The fourth area AR4 may be spaced from the data driving circuit 200 and may be adjacent to the first scan driving circuit SD1. Because the image data "DATA" delayed by the data line RC component and the first scan signal GL1 are synchronized in the fourth area AR4, a predetermined effective charging time may be secured in the fourth area AR4.

Comparing the effective charging times of the fourth area AR4 and the fifth area AR5, the image data "DATA" may be delayed due to the data line RC component, in each of the fourth area AR4 and the fifth area AR5. Compared to the first scan signal GL1 and the second scan signal GL2 provided to the fifth area AR5, a delay due to the scan line RC component may relatively small occur in the first scan signal GL1 provided to the fourth area AR4. Because the relatively small delayed first scan signal GL1 and the delayed image data "DATA" are synchronized in the fourth area AR4, a time during which signals are synchronized may be short in the fourth area AR4. Accordingly, the effective charging time of the fourth area AR4 may be relatively small. Because the delayed image data "DATA" and the delayed first scan signal GL1 and the delayed second scan signal GL2 are synchronized in the fifth area AR5, a time during which signals are synchronized may be sufficiently secured in the fifth area AR5. Accordingly, the effective charging time of the fifth area AR5 may be relatively great. That is, the effective charging time of the fourth area AR4 may be smaller than the effective charging time of the fifth area AR5.

The sixth area AR6 may be spaced from the data driving circuit 200 and may be adjacent to the second scan driving circuit SD2. Because the image data "DATA" delayed by the data line RC component and the second scan signal GL2 are synchronized in the sixth area AR6, a predetermined effective charging time may be secured in the sixth area AR6.

Comparing the effective charging times of the sixth area AR6 and the fifth area AR5, the image data "DATA" may be delayed due to the data line RC component, in each of the sixth area AR6 and the fifth area AR5. Compared to the first scan signal GL1 and the second scan signal GL2 provided to the fifth area AR5, a delay due to the scan line RC component may relatively small occur in the second scan signal GL2 provided to the sixth area AR6. Because the relatively small delayed second scan signal GL2 and the delayed image data "DATA" are synchronized in the sixth area AR6, a time during which signals are synchronized may be short in the sixth area AR6. Accordingly, the effective charging time of the sixth area AR6 may be relatively small. Because the delayed image data "DATA" and the delayed first scan signal GL1 and the delayed second scan signal GL2 are synchronized in the fifth area AR5, a time during which signals are synchronized may be sufficiently secured in the fifth area AR5. Accordingly, the effective charging time of the fifth area AR5 may be relatively great. That is, the effective charging time of the sixth area AR6 may be smaller than the effective charging time of the fifth area AR5.

The seventh area AR7 may be spaced from the data driving circuit 200 and may be adjacent to the first scan driving circuit SD1. Because the image data "DATA" delayed by the data line RC component and the first scan signal GL1 are synchronized in the seventh area AR7, a predetermined effective charging time may be secured in the seventh area AR7.

Comparing the effective charging times of the second area AR2, the fourth area AR4, the sixth area AR6 with the effective charging time of the seventh area AR7, the image data "DATA" may be delayed due to the data line RC component, in the seventh area AR7. A delay due to the scan line RC component may relatively small occur in the first scan signal GL1 provided to the seventh area AR7. Because the relatively small delayed first scan signal GL1 and the relatively much delayed image data "DATA" are synchronized in the seventh area AR7, a time during which signals are synchronized may be short in the seventh area AR7. Accordingly, the effective charging time of the seventh area AR7 may be relatively small. Accordingly, the effective charging time of the seventh area AR7 may be smaller than the effective charging time of each of the second area AR2, the fourth area AR4, and the sixth area AR6.

The ninth area AR9 may be spaced from the data driving circuit 200 and may be adjacent to the second scan driving circuit SD2. Because the image data "DATA" delayed by the data line RC component and the second scan signal GL2 are synchronized in the ninth area AR9, a predetermined effective charging time may be secured in the ninth area AR9.

Comparing the effective charging times of the second area AR2, the fourth area AR4, the sixth area AR6 with the effective charging time of the ninth area AR9, the image data "DATA" may be delayed due to the data line RC component, in the ninth area AR9. A delay due to the scan line RC component may relatively small occur in the second scan signal GL2 provided to the ninth area AR9. Because the relatively small delayed second scan signal GL2 and the relatively much delayed image data "DATA" are synchronized in the ninth area AR9, a time during which signals are synchronized may be short in the ninth area AR9. Accordingly, the effective charging time of the ninth area AR9 may be relatively small. Accordingly, the effective charging time of the ninth area AR9 may be smaller than the effective charging time of each of the second area AR2, the fourth area AR4, and the sixth area AR6.

In the case where a dither pattern is applied or in the case where an operation is performed at a high driving frequency, an effective charging time may not be sufficiently secured. Because each of the plurality of pixels PX is not sufficiently charged, luminance may decrease. However, according to the present disclosure, the data compensation unit 140 may compensate for the image data "DATA" to be provided to at least some, in which an effective charging time is not secured, from among the plurality of areas AR1 to AR9. Accordingly, the electronic device 1000 (refer to FIG. 1) providing an improved display quality may be provided.

Each of a plurality of dither patterns DT1*a* to DT3*b* may be implemented in the form of a data matrix of dimension nxm (n and m being a natural number). An embodiment in which each of the plurality of dither patterns DT1*a* to DT3*b* is implemented in the form of a data matrix of dimension 4×8. Each of the plurality of dither patterns DT1*a* to DT3*b* may include 4×8 data elements each having a first value or a second value. In the dither patterns DT1*a* to DT3*b* illustrated in FIGS. 7A to 9B, "0" indicates the first value, and "1" indicates the second value.

The data elements of the first dither pattern DT1*a* may be arranged such that the first value and the second value are alternately provided.

The data elements of the second dither pattern DT1*b* may be arranged such that the second value and the first value are alternately provided. That is, the second dither pattern DT1*b* may be in the form in which the first and second values of the first dither pattern DT1*a* are inverted.

The data elements of the third dither pattern DT2*a* may be arranged such that a 2×2 data element pattern in which two first values are arranged vertically (i.e., in a vertical direction) and two second values are respectively disposed next to the two first values is repeated.

The data elements of the fourth dither pattern DT2*b* may be arranged such that a 2×2 data element pattern in which two second values are arranged vertically and two first values are respectively disposed next to the two second values is repeated. That is, the fourth dither pattern DT2*b* may be in the form in which the first and second values of the third dither pattern DT2*a* are inverted.

The data elements of the fifth dither pattern DT3*a* may be arranged such that a 4×2 data element pattern in which four first values are arranged vertically and four second values are respectively disposed next to the four first values is repeated.

The data elements of the sixth dither pattern DT3*b* may be arranged such that a 4×2 data element pattern in which four second values are arranged vertically and four first values are respectively disposed next to the four second values is repeated. That is, the sixth dither pattern DT3*b* may be in the form in which the first and second values of the fifth dither pattern DT3*a* are inverted.

With regard to the image data "DATA", one of the plurality of dither patterns DT1*a* to DT3*b* may be selected based on the image signal RGB (refer to FIG. 2). For example, when the image signal RGB (refer to FIG. 2) corresponds to a first value, the first dither pattern DT1*a* and the second dither pattern DT1*b* may be selected. When the image signal RGB (refer to FIG. 2) corresponds to a second value, the third dither pattern DT2*a* and the fourth dither pattern DT2*b* may be selected. When the image signal RGB (refer to FIG. 2) corresponds to a third value, the fifth dither pattern DT3*a* and the sixth dither pattern DT3*b* may be selected.

The plurality of dither patterns DT1*a* to DT3*b* may be stored in a memory included in the electronic device 1000 (refer to FIG. 1) in the form of a lookup table.

The display panel DP according to an embodiment of the present disclosure may have a fixed driving frequency, and a dither pattern to be applied may vary depending the image signal RGB (refer to FIG. 2). For example, the display panel DP may operate at a driving frequency of 120 Hz.

For example, in the display panel DP, the minimum emission gray level determining unit 110 may determine a gray level of the image signal RGB (refer to FIG. 2). The gray level of the image signal RGB (refer to FIG. 2) may be a predetermined value or less. For example, the gray level of the image signal RGB (refer to FIG. 2) may have a value of 16.

The pattern determining unit 120 may determine that the first dither pattern DT1*a* and the second dither pattern DT1*b* are applied to the image signal RGB (refer to FIG. 2). The first dither pattern DT1*a* and the second dither pattern DT1*b* may be repeatedly applied to a plurality of frames. For example, the first dither pattern DT1*a* may be applied to a 2n-th frame (n being a positive integer), and the second dither pattern DT1*b* may be applied to a (2n+1)-th frame. The image data "DATA" may be provided to the display panel DP to which the first dither pattern DT1*a* and the second dither pattern DT1*b* are applied, so as to have a reference gray level capable of stably controlling a current. For example, the reference gray level may have a value of 22. As the first dither pattern DT1*a* and the second dither pattern DT1*b* are repeated every frame, the display panel DP may be visually perceived at the gray level of the image signal RGB (refer to FIG. 2). In this case, the display panel DP may be visually perceived at target luminance. The target luminance may be 1.1 nit.

The driving frequency sensing unit 130 may determine a driving frequency of the image signal RGB (refer to FIG. 2). The driving frequency sensing unit 130 may determine that the display panel DP operates at a driving frequency of 120 Hz.

Unlike the present disclosure, the first area AR1, the third area AR3, and the eighth area AR8 of the display panel DP may emit a light of (1-1)-th luminance. For example, the (1-1)-th luminance may be 1.1 nit. That is, the first area AR1, the third area AR3, and the eighth area AR8 may emit a light with the same luminance as the target luminance. Because an effective charging time is less secured, the fifth area AR5 may emit a light with (1-2)-th luminance smaller than the (1-1)-th luminance. For example, the (1-2)-th luminance may be 0.9 nit. Because an effective charging time is less secured, the second area AR2, the fourth area AR4, and the sixth area AR6 may emit a light with (1-3)-th luminance smaller than the (1-2)-th luminance. For example, the (1-3)-th luminance may be 0.7 nit. Because an effective charging time is less secured, the seventh area AR7 and the ninth area AR9 may emit a light with (1-4)-th luminance smaller than the (1-3)-th luminance. For example, the (1-4)-th luminance may be 0.5 nit. However, according to the present disclosure, the data compensation unit 140 may compensate for the image data "DATA" based on the first dither pattern DT1*a*, the second dither pattern DT1*b*, and the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

That is, the data compensation unit 140 may compensate for the image data "DATA" to be provided to the fifth area AR5 so as to have the (1-1)-th gray level. The (1-1)-th gray level may be higher than the reference gray level. For example, the (1-1)-th gray level may have a value of 24. The fifth area AR5 may emit a light with the target luminance. The data compensation unit 140 may compensate for the image data "DATA" to be provided to the second area AR2, the fourth area AR4, and the sixth area AR6 so as to have the (1-2)-th gray level. The (1-2)-th gray level may be higher than the (1-1)-th gray level. For example, the (1-2)-th gray level may have a value of 25. The second area AR2, the fourth area AR4, and the sixth area AR6 may emit a light with the target luminance. The data compensation unit 140 may compensate for the image data "DATA" to be provided to the seventh area AR7 and the ninth area AR9 so as to have the (1-3)-th gray level. The (1-3)-th gray level may be higher than the (1-2)-th gray level. For example, the (1-3)-th gray level may have a value of 27. The seventh area AR7 and the ninth area AR9 may emit a light with the target luminance. That is, the first to ninth areas AR1 to AR9 may emit a light with the same target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Accordingly, the electronic device 1000 (refer to FIG. 1) providing an improved display quality may be provided.

Also, in the display panel DP, the minimum emission gray level determining unit 110 may determine a gray level of the image signal RGB (refer to FIG. 2). The gray level of the image signal RGB (refer to FIG. 2) may be the predetermined value or less. For example, the gray level of the image signal RGB (refer to FIG. 2) may have a value of 16.

The pattern determining unit 120 may determine that the third dither pattern DT2*a* and the fourth dither pattern DT2*b* are applied to the image signal RGB (refer to FIG. 2). The third dither pattern DT2*a* and the fourth dither pattern DT2*b* may be repeatedly applied to a plurality of frames. For example, the third dither pattern DT2*a* may be applied to a 2n-th frame (n being a positive integer), and the fourth dither pattern DT2*b* may be applied to a (2n+1)-th frame.

Comparing the third dither pattern DT2*a* and the fourth dither pattern DT2*b* with the first dither pattern DT1*a* and the second dither pattern DT1*b*, the third dither pattern DT2*a* and the fourth dither pattern DT2*b* may be smaller than the first dither pattern DT1*a* and the second dither pattern DT1*b*, in the number of times of a transition from the first value to the second value. That is, a delay due to the transition between the first value and the second value may less occur. Accordingly, even though the same image data "DATA" are provided, the above delay may cause a difference between the luminance of the display panel DP to which the first dither pattern DT1*a* and the second dither pattern DT1*b* are applied and the luminance of the display panel DP to which the third dither pattern DT2*a* and the fourth dither pattern DT2*b* are applied.

The image data "DATA" may be provided to the display panel DP to which the third dither pattern DT2*a* and the fourth dither pattern DT2*b* are applied, so as to have the reference gray level capable of stably controlling a current. For example, the reference gray level may have a value of 22. As the third dither pattern DT2*a* and the fourth dither pattern DT2*b* are repeated every frame, the display panel DP may be visually perceived at the gray level of the image signal RGB (refer to FIG. 2). In this case, the display panel DP may be visually perceived at target luminance. The target luminance may be 1.1 nit. An effective charging time for each area may vary depending on a type of a dither pattern.

The driving frequency sensing unit 130 may determine a driving frequency of the image signal RGB (refer to FIG. 2). The driving frequency sensing unit 130 may determine that the display panel DP operates at a driving frequency of 120 Hz.

Unlike the present disclosure, the first area AR1, the third area AR3, and the eighth area AR8 of the display panel DP may emit a light of (2-1)-th luminance. For example, the (2-1)-th luminance may be 1.1 nit. That is, the first area AR1, the third area AR3, and the eighth area AR8 may emit a light with the same luminance as the target luminance. Because an effective charging time is less secured, the fifth area AR5 may emit a light with (2-2)-th luminance smaller than the (2-1)-th luminance. For example, the (2-2)-th luminance may be 1.0 nit. Because an effective charging time is less secured, the second area AR2, the fourth area AR4, and the sixth area AR6 may emit a light with (2-3)-th luminance smaller than the (2-2)-th luminance. For example, the (2-3)-th luminance may be 0.8 nit. Because an effective charging time is less secured, the seventh area AR7 and the ninth area AR9 may emit a light with (2-4)-th luminance smaller than the (2-3)-th luminance. For example, the (2-4)-th luminance may be 0.6 nit. However, according to the present disclosure, the data compensation unit 140 may compensate for the image data "DATA" based on the third dither pattern DT2*a*, the fourth dither pattern DT2*b*, and the gray level of the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

That is, the data compensation unit 140 may compensate for the image data "DATA" to be provided to the fifth area AR5 so as to have the (2-1)-th gray level. The (2-1)-th gray level may be higher than the reference gray level. For example, the (2-1)-th gray level may have a value of 24. The fifth area AR5 may emit a light with the target luminance. The data compensation unit 140 may compensate for the image data "DATA" to be provided to the second area AR2, the fourth area AR4, and the sixth area AR6 so as to have the (2-2)-th gray level. The (2-2)-th gray level may be higher than the (2-1)-th gray level. For example, the (2-2)-th gray level may have a value of 24. The second area AR2, the fourth area AR4, and the sixth area AR6 may emit a light with the target luminance. The data compensation unit 140 may compensate for the image data "DATA" to be provided to the seventh area AR7 and the ninth area AR9 so as to have the (2-3)-th gray level. The (2-3)-th gray level may be higher than the (2-2)-th gray level. For example, the (2-3)-th gray level may have a value of 26. The seventh area AR7 and the ninth area AR9 may emit a light with the target luminance. That is, the first to ninth areas AR1 to AR9 may emit a light with the same target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Accordingly, the electronic device 1000 (refer to FIG. 1) providing an improved display quality may be provided.

Also, in the display panel DP, the minimum emission gray level determining unit 110 may determine a gray level of the image signal RGB (refer to FIG. 2). The gray level of the image signal RGB (refer to FIG. 2) may be the predetermined value or less. For example, the gray level of the image signal RGB (refer to FIG. 2) may have a value of 16.

The pattern determining unit 120 may determine that the fifth dither pattern DT3*a* and the sixth dither pattern DT3*b* are applied to the image signal RGB (refer to FIG. 2). The fifth dither pattern DT3*a* and the sixth dither pattern DT3*b* may be repeatedly applied to a plurality of frames. For example, the fifth dither pattern DT3*a* may be applied to a 2n-th frame (n being a positive integer), and the sixth dither pattern DT3*b* may be applied to a (2n+1)-th frame.

Comparing the fifth dither pattern DT3*a* and the sixth dither pattern DT3*b* with the third dither pattern DT2*a* and the fourth dither pattern DT2*b*, the fifth dither pattern DT3*a* and the sixth dither pattern DT3*b* may be smaller than the third dither pattern DT2*a* and the fourth dither pattern DT2*b*, in the number of times of a transition from the first value to the second value. That is, a delay due to the transition between the first value and the second value may less occur.

Accordingly, even though the same image data "DATA" are provided, the above delay may cause a difference between the luminance of the display panel DP to which the third dither pattern DT2*a* and the fourth dither pattern DT2*b* are applied and the luminance of the display panel DP to which the fifth dither pattern DT3*a* and the sixth dither pattern DT3*b* are applied. That is, an effective charging time for each area may vary depending on a type of a dither pattern.

The image data "DATA" may be provided to the display panel DP to which the fifth dither pattern DT3*a* and the sixth dither pattern DT3*b* are applied, so as to have the reference gray level capable of stably controlling a current. For example, the reference gray level may have a value of 22. As the fifth dither pattern DT3*a* and the sixth dither pattern DT3*b* are repeated every frame, the display panel DP may be visually perceived at the gray level of the image signal RGB (refer to FIG. 2). In this case, the display panel DP may be visually perceived at target luminance. The target luminance may be 1.1 nit.

The driving frequency sensing unit 130 may determine a driving frequency of the image signal RGB (refer to FIG. 2). The driving frequency sensing unit 130 may determine that the display panel DP operates at a driving frequency of 120 Hz.

Unlike the present disclosure, the first area AR1, the third area AR3, the fifth area AR5, and the eighth area AR8 of the display panel DP may emit a light of (3-1)-th luminance. For example, the (3-1)-th luminance may be 1.1 nit. That is, the first area AR1, the third area AR3, the fifth area AR5, and the eighth area AR8 may emit a light with the same luminance as the target luminance. Because an effective charging time is less secured, the second area AR2, the fourth area AR4, and the sixth area AR6 may emit a light with (3-2)-th luminance smaller than the (3-1)-th luminance. For example, the (3-2)-th luminance may be 1.0 nit. Because an effective charging time is less secured, the seventh area AR7 and the ninth area AR9 may emit a light with (3-3)-th luminance smaller than the (3-2)-th luminance. For example, the (3-3)-th luminance may be 0.8 nit. However, according to the present disclosure, the data compensation unit 140 may compensate for the image data "DATA" based on the fifth dither pattern DT3*a*, the sixth dither pattern DT3*b*, and the gray level of the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

That is, the data compensation unit 140 may compensate for the image data "DATA" to be provided to the second area AR2, the fourth area AR4, and the sixth area AR6 so as to have the (3-1)-th gray level. For example, the (3-1)-th gray level may have a value of 23. The second area AR2, the fourth area AR4, and the sixth area AR6 may emit a light with the target luminance. The data compensation unit 140 may compensate for the image data "DATA" to be provided to the seventh area AR7 and the ninth area AR9 so as to have the (3-2)-th gray level. The (3-2)-th gray level may be higher than the (3-1)-th gray level. For example, the (3-2)-th gray level may have a value of 24. The seventh area AR7 and the ninth area AR9 may emit a light with the target luminance That is, the first to ninth areas AR1 to AR9 may emit a light with the same target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Accordingly, the electronic device 1000 (refer to FIG. 1) providing an improved display quality may be provided.

The display panel DP according to the present disclosure may operate at a variable driving frequency. The same dither patterns may be applied to the display panel DP.

For example, the display panel DP may operate at a driving frequency of 30 Hz. The minimum emission gray level determining unit 110 may determine a gray level of the image signal RGB (refer to FIG. 2). The gray level of the image signal RGB (refer to FIG. 2) may be the predetermined value or less. For example, the gray level of the image signal RGB (refer to FIG. 2) may have a value of 16.

The pattern determining unit 120 may determine that the first dither pattern DT1*a* and the second dither pattern DT1*b* are applied to the image signal RGB (refer to FIG. 2). The first dither pattern DT1*a* and the second dither pattern DT1*b* may be repeatedly applied to a plurality of frames. For example, the first dither pattern DT1*a* may be applied to a 2n-th frame (n being a positive integer), and the second dither pattern DT1*b* may be applied to a (2n+1)-th frame. The image data "DATA" may be provided to the display panel DP to which the first dither pattern DT1*a* and the second dither pattern DT1*b* are applied, so as to have the reference gray level capable of stably controlling a current. For example, the reference gray level may have a value of 22. As the first dither pattern DT1*a* and the second dither pattern DT1*b* are repeated every frame, the display panel DP may be visually perceived at the gray level of the image signal RGB (refer to FIG. 2). In this case, the display panel DP may be visually perceived at target luminance. The target luminance may be 1.1 nit.

The driving frequency sensing unit 130 may determine a driving frequency of the image signal RGB (refer to FIG. 2). The driving frequency sensing unit 130 may determine that the display panel DP operates in a variable driving frequency mode and operates at a driving frequency of 30 Hz.

Unlike the present disclosure, the first area AR1, the third area AR3, the fifth area AR5, and the eighth area AR8 of the display panel DP may emit a light of (4-1)-th luminance. For example, the (4-1)-th luminance may be 1.1 nit. That is, the first area AR1, the third area AR3, the fifth area AR5, and the eighth area AR8 may emit a light with the same luminance as the target luminance. Because an effective charging time is less secured, the second area AR2, the fourth area AR4, and the sixth area AR6 may emit a light with (4-2)-th luminance smaller than the (4-1)-th luminance. For example, the (4-2)-th luminance may be 1.0 nit. Because an effective charging time is less secured, the seventh area AR7 and the ninth area AR9 may emit a light with (4-3)-th luminance smaller than the (4-2)-th luminance. For example, the (4-3)-th luminance may be 0.8 nit. However, according to the present disclosure, the data compensation unit 140 may compensate for the image data "DATA" based on the first dither pattern DT1*a*, the second dither pattern DT1*b*, the driving frequency, and the gray level of the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

That is, the data compensation unit 140 may compensate for the image data "DATA" to be provided to the second area AR2, the fourth area AR4, and the sixth area AR6 so as to have the (4-1)-th gray level. The (4-1)-th gray level may be higher than the reference gray level. For example, the (4-1)-th gray level may have a value of 23. The second area AR2, the fourth area AR4, and the sixth area AR6 may emit a light with the target luminance. The data compensation unit 140 may compensate for the image data "DATA" to be provided to the seventh area AR7 and the ninth area AR9 so as to have the (4-2)-th gray level. The (4-2)-th gray level may be higher than the (4-1)-th gray level. For example, the (4-2)-th gray level may have a value of 24. The seventh area AR7 and the ninth area AR9 may emit a light with the target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Accordingly, the electronic device 1000 (refer to FIG. 1) providing an improved display quality may be provided.

For example, the display panel DP may operate at a driving frequency of 60 Hz. The minimum emission gray level determining unit 110 may determine a gray level of the image signal RGB (refer to FIG. 2). The gray level of the image signal RGB (refer to FIG. 2) may be the predetermined value or less. For example, the gray level of the image signal RGB (refer to FIG. 2) may have a value of 16.

The pattern determining unit 120 may determine that the first dither pattern DT1*a* and the second dither pattern DT1*b* are applied to the image signal RGB (refer to FIG. 2). The image data "DATA" may be provided to the display panel DP to which the first dither pattern DT1*a* and the second dither pattern DT1*b* are applied, so as to have the reference gray level capable of stably controlling a current. For example, the reference gray level may have a value of 22. As the first dither pattern DT1*a* and the second dither pattern DT1*b* are repeated every frame, the display panel DP may be visually perceived at the gray level of the image signal RGB (refer to FIG. 2). In this case, the display panel DP may be visually perceived at target luminance. The target luminance may be 1.1 nit.

The driving frequency sensing unit 130 may determine a driving frequency of the image signal RGB (refer to FIG. 2). The driving frequency sensing unit 130 may determine that the display panel DP operates in a variable driving frequency mode and operates at a driving frequency of 60 Hz. As a driving frequency increases, it may be difficult to secure an effective charging time.

Unlike the present disclosure, the first area AR1, the third area AR3, and the eighth area AR8 of the display panel DP may emit a light of (5-1)-th luminance. For example, the (5-1)-th luminance may be 1.1 nit. That is, the first area AR1, the third area AR3, and the eighth area AR8 may emit a light with the same luminance as the target luminance. Because an effective charging time is less secured, the fifth area AR5 may emit a light with (5-2)-th luminance smaller than the (5-1)-th luminance. For example, the (5-2)-th luminance may be 1.0 nit. Because an effective charging time is less secured, the second area AR2, the fourth area AR4, and the sixth area AR6 may emit a light with (5-3)-th luminance smaller than the (5-2)-th luminance. For example, the (5-3)-th luminance may be 0.8 nit. Because an effective charging time is less secured, the seventh area AR7 and the ninth area AR9 may emit a light with (5-4)-th luminance smaller than the (5-3)-th luminance. For example, the (5-4)-th luminance may be 0.6 nit. However, according to the present disclosure, the data compensation unit 140 may compensate for the image data "DATA" based on the first dither pattern DT1*a*, the second dither pattern DT1*b*, the driving frequency, and the gray level of the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

That is, the data compensation unit 140 may compensate for the image data "DATA" to be provided to the fifth area AR5 so as to have the (5-1)-th gray level. The (5-1)-th gray level may be higher than the reference gray level. For example, the (5-1)-th gray level may have a value of 23. The fifth area AR5 may emit a light with the target luminance. The data compensation unit 140 may compensate for the image data "DATA" to be provided to the second area AR2, the fourth area AR4, and the sixth area AR6 so as to have the (5-2)-th gray level. For example, the (5-2)-th gray level may have a value of 24. The second area AR2, the fourth area AR4, and the sixth area AR6 may emit a light with the target luminance. The data compensation unit 140 may compensate for the image data "DATA" to be provided to the seventh area AR7 and the ninth area AR9 so as to have the (5-3)-th gray level higher the (5-2)-th gray level. For example, the (5-3)-th gray level may have a value of 26. The seventh area AR7 and the ninth area AR9 may emit a light with the target luminance. That is, the first to ninth areas AR1 to AR9 may emit a light with the same target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Also, a luminance difference for each driving frequency may be prevented from occurring due to the variation of the effective charging time according to a change of the driving frequency, and it may be possible to alleviate the flicker phenomenon. Accordingly, the electronic device 1000 (refer to FIG. 1) providing an improved display quality may be provided.

The display panel DP may operate at a driving frequency of 120 Hz. The minimum emission gray level determining unit 110 may determine a gray level of the image signal RGB (refer to FIG. 2). The gray level of the image signal RGB (refer to FIG. 2) may be the predetermined value or less. For example, the gray level of the image signal RGB (refer to FIG. 2) may have a value of 16.

The pattern determining unit 120 may determine that the first dither pattern DT1*a* and the second dither pattern DT1*b* are applied to the image signal RGB (refer to FIG. 2). The image data "DATA" may be provided to the display panel DP to which the first dither pattern DT1*a* and the second dither pattern DT1*b* are applied, so as to have the reference gray level capable of stably controlling a current. For example, the reference gray level may have a value of 22. As the first dither pattern DT1*a* and the second dither pattern DT1*b* are repeated every frame, the display panel DP may be visually perceived at the gray level of the image signal RGB (refer to FIG. 2). In this case, the display panel DP may be visually perceived at target luminance. The target luminance may be 1.1 nit.

The driving frequency sensing unit 130 may determine a driving frequency of the image signal RGB (refer to FIG. 2). The driving frequency sensing unit 130 may determine that the display panel DP operates in a variable driving frequency mode and operates at a driving frequency of 120 Hz. As a driving frequency increases, it may be difficult to secure an effective charging time.

Unlike the present disclosure, the first area AR1, the third area AR3, and the eighth area AR8 of the display panel DP may emit a light of (6-1)-th luminance. For example, the (6-1)-th luminance may be 1.1 nit. Because an effective charging time is less secured, the fifth area AR5 may emit a light with (6-2)-th luminance smaller than the (6-1)-th luminance. For example, the (6-2)-th luminance may be 0.9 nit. Because an effective charging time is less secured, the second area AR2, the fourth area AR4, and the sixth area AR6 may emit a light with (6-3)-th luminance smaller than the (6-2)-th luminance. For example, the (6-3)-th luminance may be 0.7 nit. Because an effective charging time is less secured, the seventh area AR7 and the ninth area AR9 may emit a light with (6-4)-th luminance smaller than the (6-3)-th luminance. For example, the (6-4)-th luminance may be 0.5 nit. However, according to the present disclosure, the data compensation unit 140 may compensate for the image data "DATA" based on the first dither pattern DT1*a*, the second dither pattern DT1*b*, the driving frequency, and the fradation of the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

That is, the data compensation unit 140 may compensate for the image data "DATA" to be provided to the fifth area AR5 so as to have the (6-1)-th gray level. The (6-1)-th gray level may be higher than the reference gray level. For example, the (6-1)-th gray level may have a value of 24. The fifth area AR5 may emit a light with the target luminance. The data compensation unit 140 may compensate for the image data "DATA" to be provided to the second area AR2, the fourth area AR4, and the sixth area AR6 so as to have the (6-2)-th gray level higher than the (6-1)-th gray level. For example, the (6-2)-th gray level may have a value of 25. The second area AR2, the fourth area AR4, and the sixth area AR6 may emit a light with the target luminance. The data compensation unit 140 may compensate for the image data "DATA" to be provided to the seventh area AR7 and the ninth area AR9 so as to have the (6-3)-th gray level higher the (6-2)-th gray level. For example, the (6-3)-th gray level may have a value of 27. The seventh area AR7 and the ninth area AR9 may emit a light with the target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Also, a luminance difference for each driving frequency may be prevented from occurring due to the variation of the effective charging time according to a change of the driving frequency, and it may be possible to alleviate the flicker phenomenon. Accordingly, the electronic device 1000 (refer to FIG. 1) providing an improved display quality may be provided.

The display panel DP according to an embodiment of the present disclosure may have a fixed driving frequency, and a dither pattern to be applied may vary depending the image signal RGB (refer to FIG. 2).

For example, in the display panel DP, the minimum emission gray level determining unit 110 may determine a gray level of the image signal RGB (refer to FIG. 2). The gray level of the image signal RGB (refer to FIG. 2) may be the predetermined value or less. For example, the gray level of the image signal RGB (refer to FIG. 2) may have a value of 16.

The pattern determining unit 120 may determine that the first dither pattern DT1*a* and the second dither pattern DT1*b* are applied to the image signal RGB (refer to FIG. 2). As the first dither pattern DT1*a* and the second dither pattern DT1*b* are repeated every frame, the display panel DP may be visually perceived at the gray level of the image signal RGB (refer to FIG. 2). In this case, the display panel DP may be visually perceived at target luminance. The target luminance may be 1.1 nit.

The driving frequency sensing unit 130 may determine a driving frequency of the image signal RGB (refer to FIG. 2). The driving frequency sensing unit 130 may determine that the display panel DP operates at a driving frequency of 30 Hz.

Unlike the present disclosure, the first area AR1, the third area AR3, the fifth area AR5, and the eighth area AR8 of the display panel DP may emit a light of (7-1)-th luminance. For example, the (7-1)-th luminance may be 1.1 nit. That is, the first area AR1, the third area AR3, the fifth area AR5, and the eighth area AR8 may emit a light with the same luminance as the target luminance. Because an effective charging time is less secured, the second area AR2, the fourth area AR4, and the sixth area AR6 may emit a light with (7-2)-th luminance smaller than the (7-1)-th luminance. For example, the (7-2)-th luminance may be 1.0 nit. Because an effective charging time is less secured, the seventh area AR7 and the ninth area AR9 may emit a light with (7-3)-th luminance smaller than the (7-2)-th luminance. For example, the (7-3)-th luminance may be 0.8 nit. However, according to the present disclosure, the data compensation unit 140 may compensate for the image data "DATA" based on the first dither pattern DT1*a*, the second dither pattern DT1*b*, the driving frequency, and the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

That is, the data compensation unit 140 may compensate for the image data "DATA" to be provided to the second area AR2, the fourth area AR4, and the sixth area AR6 so as to have the (7-1)-th gray level. The (7-1)-th gray level may be higher than the reference gray level. For example, the (7-1)-th gray level may have a value of 23. The second area AR2, the fourth area AR4, and the sixth area AR6 may emit a light with the target luminance. The data compensation unit 140 may compensate for the image data "DATA" to be provided to the seventh area AR7 and the ninth area AR9 so as to have the (7-2)-th gray level higher than the (7-1)-th gray level. For example, the (7-2)-th gray level may have a value of 24. The seventh area AR7 and the ninth area AR9 may emit a light with the target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Also, a luminance difference for each driving frequency may be prevented from occurring due to the variation of the effective charging time according to a change of the driving frequency, and it may be possible to alleviate the flicker phenomenon. Accordingly, the electronic device 1000 (refer to FIG. 1) providing an improved display quality may be provided.

Also, in the display panel DP, the minimum emission gray level determining unit 110 may determine a gray level of the image signal RGB (refer to FIG. 2). The gray level of the image signal RGB (refer to FIG. 2) may be the predetermined value or less. For example, the gray level of the image signal RGB (refer to FIG. 2) may have a value of 16.

The pattern determining unit 120 may determine that the fifth dither pattern DT3*a* and the sixth dither pattern DT3*b* are applied to the image signal RGB (refer to FIG. 2). The fifth dither pattern DT3*a* and the sixth dither pattern DT3*b* may be repeatedly applied to a plurality of frames. For example, the fifth dither pattern DT3*a* may be applied to a 2n-th frame (n being a positive integer), and the sixth dither pattern DT3*b* may be applied to a (2n+1)-th frame. The image data "DATA" may be provided to the display panel DP to which the fifth dither pattern DT3*a* and the sixth dither pattern DT3*b* are applied, so as to have the reference gray level capable of stably controlling a current. As the fifth dither pattern DT3*a* and the sixth dither pattern DT3*b* are repeated every frame, the display panel DP may be visually perceived at the gray level of the image signal RGB (refer to FIG. 2). In this case, the display panel DP may be visually perceived at target luminance. The target luminance may be 1.1 nit. An effective charging time for each area may vary depending on a type of a dither pattern.

The driving frequency sensing unit 130 may determine a driving frequency of the image signal RGB (refer to FIG. 2). The driving frequency sensing unit 130 may determine that the display panel DP operates at a driving frequency of 60 Hz. As a driving frequency increases, it may be difficult to secure an effective charging time.

Unlike the present disclosure, the first area AR1, the second area AR2, the third area AR3, the fourth area AR4, the fifth area AR5, the sixth area AR6, and the eighth area AR8 of the display panel DP may emit a light of (8-1)-th luminance. For example, the (8-1)-th luminance may be 1.1 nit. That is, the first area AR1, the second area AR2, the third area AR3, the fourth area AR4, the fifth area AR5, the sixth area AR6, and the eighth area AR8 of the display panel DP may emit a light with the same luminance as the target luminance. Because an effective charging time is less secured, the seventh area AR7 and the ninth area AR9 may emit a light with (8-2)-th luminance smaller than the (8-1)-th luminance. For example, the (8-2)-th luminance may be 1.0 nit. However, according to the present disclosure, the data compensation unit 140 may compensate for the image data "DATA" based on the fifth dither pattern DT3*a*, the sixth dither pattern DT3*b*, the driving frequency, and the gray level of the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

The data compensation unit 140 may compensate for the image data "DATA" to be provided to the seventh area AR7 and the ninth area AR9 so as to have the (8-1)-th gray level. The (8-1)-th gray level may be higher than the reference gray level. For example, the (8-1)-th gray level may have a value of 23. The seventh area AR7 and the ninth area AR9 may emit a light with the target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Also, a luminance difference for each driving frequency may be prevented from occurring due to the variation of the effective charging time according to a change of the driving frequency, and it may be possible to alleviate the flicker phenomenon. Accordingly, the electronic device 1000 (refer to FIG. 1) providing an improved display quality may be provided.

Also, in the display panel DP, the minimum emission gray level determining unit 110 may determine a gray level of the image signal RGB (refer to FIG. 2). The gray level of the image signal RGB (refer to FIG. 2) may be the predetermined value or less. For example, the gray level of the image signal RGB (refer to FIG. 2) may have a value of 16.

The pattern determining unit 120 may determine that the third dither pattern DT2*a* and the fourth dither pattern DT2*b* are applied to the image signal RGB (refer to FIG. 2). The third dither pattern DT2*a* and the fourth dither pattern DT2*b* may be repeatedly applied to a plurality of frames. For example, the third dither pattern DT2*a* may be applied to a 2n-th frame (n being a positive integer), and the fourth dither pattern DT2*b* may be applied to a (2n+1)-th frame. The image data "DATA" may be provided to the display panel DP to which the third dither pattern DT2*a* and the fourth dither pattern DT2*b* are applied, so as to have the reference gray level capable of stably controlling a current. As the third dither pattern DT2*a* and the fourth dither pattern DT2*b* are repeated every frame, the display panel DP may be visually perceived at the gray level of the image signal RGB (refer to FIG. 2). In this case, the display panel DP may be visually perceived at target luminance. The target luminance may be 1.1 nit. An effective charging time for each area may vary depending on a type of a dither pattern.

The driving frequency sensing unit 130 may determine a driving frequency of the image signal RGB (refer to FIG. 2). The driving frequency sensing unit 130 may determine that the display panel DP operates at a driving frequency of 120 Hz. As a driving frequency increases, it may be difficult to secure an effective charging time.

Unlike the present disclosure, the first area AR1, the third area AR3, and the eighth area AR8 of the display panel DP may emit a light of (9-1)-th luminance. For example, the (9-1)-th luminance may be 1.1 nit. That is, the first area AR1, the third area AR3, and the eighth area AR8 may emit a light with the same luminance as the target luminance. Because an effective charging time is less secured, the fifth area AR5 may emit a light with (9-2)-th luminance smaller than the (9-1)-th luminance. For example, the (9-2)-th luminance may be 1.0 nit. Because an effective charging time is less secured, the second area AR2, the fourth area AR4, and the sixth area AR6 may emit a light with (9-3)-th luminance smaller than the (9-2)-th luminance. For example, the (9-3)-th luminance may be 0.8 nit. Because an effective charging time is less secured, the seventh area AR7 and the ninth area AR9 may emit a light with (9-4)-th luminance smaller than the (9-3)-th luminance. For example, the (9-4)-th luminance may be 0.6 nit. However, according to the present disclosure, the data compensation unit 140 may compensate for the image data "DATA" based on the third dither pattern DT2*a*, the fourth dither pattern DT2*b*, the driving frequency, and the gray level of the image signal RGB (refer to FIG. 2). The data compensation unit 140 may compensate for a portion of the image data "DATA" to be provided to at least some, in which an effective charging time is not secured, from among the plurality of areas AR1 to AR9 based on a previously stored lookup table.

That is, the data compensation unit 140 may compensate for the image data "DATA" to be provided to the fifth area AR5 so as to have the (9-1)-th gray level. The (9-1)-th gray level may be higher than the reference gray level. For example, the (9-1)-th gray level may have a value of 23. The fifth area AR5 may emit a light with the target luminance. The data compensation unit 140 may compensate for the image data "DATA" to be provided to the second area AR2, the fourth area AR4, and the sixth area AR6 so as to have the (9-2)-th gray level higher than the (9-1)-th gray level. For example, the (9-2)-th gray level may have a value of 24. The second area AR2, the fourth area AR4, and the sixth area AR6 may emit a light with the target luminance. The data compensation unit 140 may compensate for the image data "DATA" to be provided to the seventh area AR7 and the ninth area AR9 so as to have the (9-3)-th gray level higher than the (9-2)-th gray level. For example, the (9-3)-th gray level may have a value of 26. The seventh area AR7 and the ninth area AR9 may emit a light with the target luminance.

According to the present disclosure, the data compensation unit 140 may compensate for the image data "DATA" such that the display panel DP emits a light with uniform luminance at a low gray level. For example, the low gray level may be a gray level having a value of 16 or less; in this case, the control may be made such that a light is emitted with the target luminance. The data compensation unit 140 may prevent a luminance difference for each area, which is capable of occurring due to a difference between effective charging times of a plurality of areas of the display panel DP. The low-gray level blemish (or mura) phenomenon of the electronic device 1000 (refer to FIG. 1) may be improved. Also, a luminance difference for each driving frequency may be prevented from occurring due to the variation of the effective charging time according to a change of the driving frequency, and it may be possible to alleviate the flicker phenomenon. Accordingly, the electronic device 1000 (refer to FIG. 1) providing an improved display quality may be provided.

According to the above description, a data compensation unit may compensate for image data such that a display panel emits a light with uniform luminance at a low gray level. The data compensation unit may prevent a luminance difference for each area, which is capable of occurring due to a difference between effective charging times of a plurality of areas of the display panel, and may improve a low-gray level blemish (or mura) phenomenon. Also, a luminance difference for each driving frequency may be prevented from occurring due to the variation of the effective charging time according to a change of the driving frequency, and it may be possible to alleviate the flicker phenomenon. Accordingly, an electronic device providing an improved display quality may be provided.

While the present disclosure has been described with reference to embodiments thereof, it will be apparent to those of ordinary skill in the art that various changes and modifications may be made thereto without departing from the spirit and scope set forth in the following claims.

What is claimed is:

1. An electronic device comprising:
- a display panel configured to display an image, and including a plurality of pixels connected with a plurality of data lines and a plurality of scan lines;
- a data driving circuit configured to drive the plurality of data lines;
- a scan driving circuit configured to drive the plurality of scan lines; and
- a driving controller configured to generate image data based on a received image signal and to control the data driving circuit and the scan driving circuit,
- wherein the driving controller is configured to determine a gray level of the image signal,
- wherein the driving controller is configured to determine a dither pattern of the image signal,
- wherein the driving controller is configured to determine a driving frequency of the image signal,
- wherein the driving controller is configured to determine whether the gray level is a predetermined value or less,
- wherein the driving controller is configured to determine whether dithering is applied to the image data when the gray level is the predetermined value or less,
- wherein the driving controller is configured to determine whether the display panel operates in a variable driving frequency mode when it is determined that the dithering is applied, and
- wherein the driving controller is configured to compensate for the image data based on the gray level and the dither pattern when it is determined that the display panel does not operate in the variable driving frequency mode.

2. An electronic device comprising:
- a display panel configured to display an image, and including a plurality of pixels connected with a plurality of data lines and a plurality of scan lines;
- a data driving circuit configured to drive the plurality of data lines;
- a scan driving circuit configured to drive the plurality of scan lines; and a driving controller configured to generate image data based on a received image signal and to control the data driving circuit and the scan driving circuit, wherein the driving controller is configured to determine a gray level of the image signal, wherein the driving controller is configured to determine a dither pattern of the image signal, wherein the driving controller is configured to determine a driving frequency of the image signal, wherein the driving controller is configured to determine whether the gray level is a predetermined value or less, wherein the driving controller is configured to determine whether dithering is applied to the image data when the gray level is the predetermined value or less, wherein the driving controller is configured to determine whether the display panel operates in a variable driving frequency mode when it is determined that the dithering is applied, and wherein the driving controller is configured to compensate for the image data based on the gray level, the dither pattern, and the driving frequency when it is determined that the display panel operates in the variable driving frequency mode.

3. The electronic device of claim 1, wherein the display panel is configured to be driven in units of frame, and wherein the driving controller is configured to determine the dither pattern every frame.

4. The electronic device of claim 1, wherein the display panel is configured to be driven in units of frame, and wherein the driving controller is configured to determine the driving frequency every frame.

5. The electronic device of claim 1, wherein the driving controller includes a lookup table based on at least one of the dither pattern and the driving frequency, and wherein the driving controller is configured to compensate for the image data based on the lookup table.

6. The electronic device of claim 1, wherein the display panel is divided into a plurality of areas, and wherein the driving controller is configured to compensate for a portion of the image data, which is provided to at least some of the plurality of areas.

7. A driving method of an electronic device, the method comprising:

generating image data based on an image signal received for displaying an image in a display panel;

determining a gray level of the image based on the image signal and whether the gray level is a predetermined value or less;

determining a dither pattern of the image and whether dithering is applied to the image when the gray level is the predetermined value or less based on the image signal;

determining a driving frequency of the image based on the image signal and, when it is determined that the dithering is applied, determining whether the driving frequency of the image signal is variable; and determining whether to compensate for the image data based on the gray level and at least one of the dither pattern and the driving frequency and compensating for the image data, wherein the compensating for the image data includes:

when the gray level is the predetermined value or less, the dither pattern is applied to the image signal, and the display panel does not operate in a variable driving frequency, compensating for the image data only based on the gray level and the dither pattern.

8. A driving method of an electronic device, the method comprising:

generating image data based on an image signal received for displaying an image in a display panel;

determining a gray level of the image based on the image signal and whether the gray level is a predetermined value or less;

determining a dither pattern of the image and whether dithering is applied to the image when the gray level is the predetermined value or less based on the image signal;

determining a driving frequency of the image based on the image signal and, when it is determined that the dithering is applied, determining whether the driving frequency of the image signal is variable; and determining whether to compensate for the image data based on the gray level and at least one of the dither pattern and the driving frequency and compensating for the image data, wherein the compensating for the image data includes:

when the gray level is the predetermined value or less, the dither pattern is applied to the image signal, and the display panel operates in a variable driving frequency, compensating for the image data based on the gray level, the dither pattern, and the driving frequency.

9. The method of claim 7, wherein the display panel is divided into a plurality of areas, and wherein the compensating for the image data includes:

compensating for a portion of the image data, which is provided to at least some of the plurality of areas.

* * * * *